(12) United States Patent
Carman et al.

(10) Patent No.: US 8,689,080 B2
(45) Date of Patent: *Apr. 1, 2014

(54) PREEMPTIVE MEMORY REPAIR BASED ON MULTI-SYMBOL, MULTI-SCRUB CYCLE ANALYSIS

(75) Inventors: Jay W. Carman, Austin, TX (US); Marc A. Gollub, Round Rock, TX (US); Anshuman Khandual, Austin, TX (US); Jyotindra Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,998

(22) Filed: Aug. 21, 2012

(65) Prior Publication Data
US 2013/0007542 A1 Jan. 3, 2013

Related U.S. Application Data

(63) Continuation of application No. 13/171,675, filed on Jun. 29, 2011.

(51) Int. Cl.
*G11C 29/00* (2006.01)
(52) U.S. Cl.
USPC .......................................... 714/763; 714/710
(58) Field of Classification Search
USPC .................. 714/710, 718, 758, 763, 764
See application file for complete search history.

(56) References Cited

U.S. PATENT DOCUMENTS

| | | | |
|---|---|---|---|
| 6,035,436 A | 3/2000 | Wu et al. | |
| 6,279,128 B1 | 8/2001 | Arnold et al. | |
| 7,055,003 B2 | 5/2006 | Cargnoni et al. | |
| 7,134,069 B1 * | 11/2006 | Longwell et al. | 714/800 |
| 7,246,269 B1 | 7/2007 | Hamilton | |
| 7,272,773 B2 | 9/2007 | Cargnoni et al. | |
| 8,024,638 B2 * | 9/2011 | Resnick et al. | 714/758 |

(Continued)

FOREIGN PATENT DOCUMENTS

WO WO9532470 11/1995

OTHER PUBLICATIONS

Agarwal, A.; Bhatia, G.; Chakraverty, S., "State model for scheduling Built-in Self-Test and scrubbing in FPGA to maximize the system availability in space applications," Power Electronics (IICPE), 2010 India International Conference on , vol., no., pp. 1,7, Jan. 28-30, 2011.*

(Continued)

*Primary Examiner* — Cynthia Britt
(74) *Attorney, Agent, or Firm* — DeLizio Gilliam, PLLC

(57) ABSTRACT

In some example embodiments, a method includes performing a memory scrub of a memory across a scrub cycle of multiple scrub cycles. The method includes identifying correctable errors of symbols in the memory that are a result of accesses from a section of the memory in response to the memory scrub. The method also includes performing an analysis across the multiple scrub cycles, wherein the performing of the analysis comprises determining whether at least two symbols across the multiple scrub cycles have at least one correctable error. The method includes responsive to determining that at least two symbols across the multiple scrub cycles have at least one correctable error, executing at least one repair of the memory that includes the section of memory.

10 Claims, 7 Drawing Sheets

(56) References Cited

U.S. PATENT DOCUMENTS

2002/0162076 A1 10/2002 Talagala et al.
2005/0154943 A1 7/2005 Alexander et al.
2005/0240801 A1 10/2005 Johnson et al.
2006/0212778 A1 9/2006 Wheeler et al.
2007/0089032 A1 4/2007 Alexander et al.
2009/0164842 A1 6/2009 Browne et al.
2009/0177932 A1 7/2009 Abts et al.
2009/0307523 A1 12/2009 Allison et al.
2009/0327638 A1 12/2009 Buch
2011/0029807 A1 2/2011 Fry et al.
2013/0007541 A1 1/2013 Carman et al.

OTHER PUBLICATIONS

IBM, , "IBM System p. 570 with new POWER6 processor increases bandwidth and capacity", IBM United States Annoucement 107-288, dated May 22, 2007, 43 pages.
U.S. Appl. No. 13/171,675, filed Jun. 29, 2011, Carman, Jay W., et al.
"UK Application No. GB1207326.8 Search Report", Sep. 27, 2012, 5 pages.
"U.S. Appl. No. 13/171,675 Office Action", May 9, 2013, 16 pages.
Jeon, Seungjune et al., "LDPC Codes for Memory Systems with Scrubbing", IEEE publication Email: { sjeon, euiseokh} @cmu.edu, kumar@ece.cmu.edu; Email: mkcheng@jpl.nasa.gov 2010, pp. 1-6.

* cited by examiner

300

SCRUB CYCLES

CURRENT SCRUB CYCLE

SYMBOLS

| | 322 | 324 | 326 | 328 | 330 | 332 | 334 | 336 | 338 | ... | 340 |
|---|---|---|---|---|---|---|---|---|---|---|---|
| 302 | 0 | 0 | 0 | 0 | 20 | 0 | 0 | 0 | 0 | ... | 0 |
| 304 | 0 | 0 | 0 | 0 | 20 | 0 | 0 | 0 | 0 | ... | 0 |
| 306 | 0 | 0 | 0 | 0 | 15 | 0 | 0 | 0 | 0 | ... | 0 |
| 308 | 0 | 0 | 0 | 0 | 20 | 0 | 0 | 0 | 0 | ... | 0 |
| 310 | 0 | 0 | 0 | 0 | 35 | 0 | 0 | 0 | 0 | ... | 0 |
| 312 | 0 | 0 | 0 | 0 | 20 | 0 | 0 | 0 | 0 | ... | 0 |
| 314 | 0 | 0 | 0 | 0 | 20 | 0 | 0 | 0 | 0 | ... | 0 |
| 316 | 16 | 0 | 0 | 0 | 20 | 0 | 0 | 0 | 0 | ... | 11 |
| 318 | 0 | 0 | 0 | 0 | 18 | 0 | 0 | 0 | 0 | ... | 0 |
| | ... | ... | ... | ... | ... | ... | ... | ... | ... | ... | ... |
| 320 | 0 | 0 | 0 | 0 | 15 | 0 | 0 | 0 | 0 | ... | 0 |

OLDEST SCRUB CYCLE

SCRUB CYCLES

SYMBOLS

CURRENT SCRUB CYCLE

| | 722 | 724 | 726 | 728 | 730 | 732 | 734 | 736 | 738 | | 740 |
|---|---|---|---|---|---|---|---|---|---|---|---|
| 702 | 0 | 0 | 0 | 0 | 0 | 0 | 0 | 0 | 0 | ... | 0 |
| 704 | 0 | 0 | 0 | 0 | 0 | 0 | 0 | 0 | 0 | ... | 0 |
| 706 | 0 | 0 | 0 | 0 | 0 | 0 | 0 | 0 | 0 | ... | 0 |
| 708 | 0 | 0 | 0 | 0 | 20 | 0 | 0 | 0 | 0 | ... | 0 |
| 710 | 0 | 0 | 0 | 0 | 35 | 0 | 0 | 0 | 0 | ... | 0 |
| 712 | 0 | 0 | 0 | 0 | 20 | 0 | 0 | 0 | 0 | ... | 0 |
| 714 | 0 | 0 | 0 | 0 | 0 | 0 | 0 | 0 | 0 | ... | 0 |
| 716 | 5 | 0 | 0 | 0 | 0 | 0 | 0 | 0 | 0 | ... | 1 |
| 718 | 1 | 0 | 0 | 0 | | 0 | 0 | 0 | 0 | ... | 0 |
| ... | ... | ... | ... | ... | ... | ... | ... | ... | ... | ... | ... |
| 720 | 0 | 0 | 0 | 0 | | 0 | 0 | 0 | 0 | ... | 1 |

OLDEST SCRUB CYCLE

PREEMPTIVE MEMORY REPAIR BASED ON MULTI-SYMBOL, MULTI-SCRUB CYCLE ANALYSIS

RELATED APPLICATIONS

This application claims the priority benefit of U.S. application Ser. No. 13/171,675 filed Jun. 29, 2011.

BACKGROUND

Embodiments of the inventive subject matter generally relate to the field of computers and, more particularly, to preemptive repair of memory for computers, apparatuses, devices, etc.

Modern computer systems typically are configured with a large amount of memory in order to provide data and instructions to one or more processors in the computer systems. Historically, processor speeds have increased more rapidly than memory access times to large portions of memory, in particular, DRAM memory (Dynamic Random Access Memory). Memory hierarchies have been constructed to reduce the performance mismatches between processors and memory. For example, most modern processors are constructed having an L1 (level 1) cache, constructed of SRAM (Static Random Access Memory) on a processor semiconductor chip. L1 cache is very fast, providing reads and writes in only one, or several cycles of the processor. However, L1 caches, while very fast, are also quite small, perhaps 64 KB (Kilobytes) to 256 KB. An L2 (Level 2) cache is often also implemented on the processor chip. L2 cache is typically also constructed using SRAM storage, although some processors utilize DRAM storage. The L2 cache is typically several times larger in number of bytes than the L1 cache, but is slower to read or write. Some modern processor chips also contain an L3 (Level 3) cache. L3 cache is capable of holding several times more data than the L2 cache. L3 cache is sometimes constructed with DRAM storage. L3 cache in some computer systems is implemented on a separate chip or chips from the processor, and is coupled to the processor with wiring on a printed wiring board (PWB) or a multi-chip module (MCM). Main memory of the computer system is typically large, often many GB (gigabytes) and is typically implemented in DRAM.

Main memory is typically coupled to a processor with a memory controller, which may be integrated on the same device as the processor or located separate from the processor, often on the same MCM (multi-chip module) or PWB. The memory controller receives load or read commands and store or write commands from the processor and services those commands, reading data from main memory or writing data to main memory. Typically, the memory controller has one or more queues, for example, read queues and write queues. The read queues and write queues buffer information including one or more of commands, controls, addresses and data; thereby enabling the processor to have multiple requests—including read and/or write requests, in process at a given time.

Extensive research and development efforts are invested by the industry, on an ongoing basis, to create improved, innovative solutions for maximizing overall system performance and density by improving the memory system or memory subsystem design and structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, and the like. Other frequent customer requirements further exacerbate the memory system design challenges, and include such items as ease of upgrade and reduced system environmental impact, such as space, power and cooling.

As speeds of DRAM interfaces increase there becomes an increased probability of a read including a correctable error resulting from one or more of the memory devices, any interconnect structure in the memory signal path, the memory interface, coupled noise, power supply fluctuations or noise, temperature variations, timing drift, and the like.

SUMMARY

In some example embodiments, a method includes performing a memory scrub of a memory across a scrub cycle of multiple scrub cycles. The method includes identifying correctable errors of symbols in the memory that are a result of accesses from a section of the memory in response to the memory scrub. The method also includes performing an analysis across the multiple scrub cycles, wherein the performing of the analysis comprises determining whether at least two symbols across the multiple scrub cycles have at least one correctable error. The method includes responsive to determining that at least two symbols across the multiple scrub cycles have at least one correctable error, executing at least one repair of the memory that includes the section of memory.

In some example embodiments, a method includes performing a memory scrub of a memory across a scrub cycle of a number of scrub cycles. The method includes identifying correctable errors of symbols in the memory that are a result of accesses from a section of the memory in response to the memory scrub. The method also includes performing an analysis across the number of scrub cycles, wherein the performing of the analysis comprises determining whether at least one correctable error has been identified for each of at least two symbols of the symbols. The performing of the analysis also includes determining whether at least one symbol of the at least two symbols has correctable errors that exceed a threshold. The performing of the analysis also includes responsive to determining that the at least one other symbol has correctable errors that exceed the threshold, determining whether at least one other symbol of the symbols has correctable errors that exceed the threshold. The method includes responsive to determining that at least one correctable error has been identified for each of the at least two symbols and determining that the at least one symbol of the at least two symbols has correctable errors that exceed the threshold and determining that the at least one other symbol has correctable errors that exceed the threshold, executing at least one repair of the memory that includes the section of the memory.

BRIEF DESCRIPTION OF THE DRAWINGS

The present embodiments may be better understood, and numerous objects, features, and advantages made apparent to those skilled in the art by referencing the accompanying drawings.

FIG. 3 depicts a two-dimensional table for storage of errors for multiple symbols across multiple scrub cycles, according to some example embodiments.

FIG. 7 depicts a two-dimensional table for storage of errors for multiple symbols across multiple scrub cycles, according to some other example embodiments.

DESCRIPTION OF EMBODIMENT(S)

Figure 1:
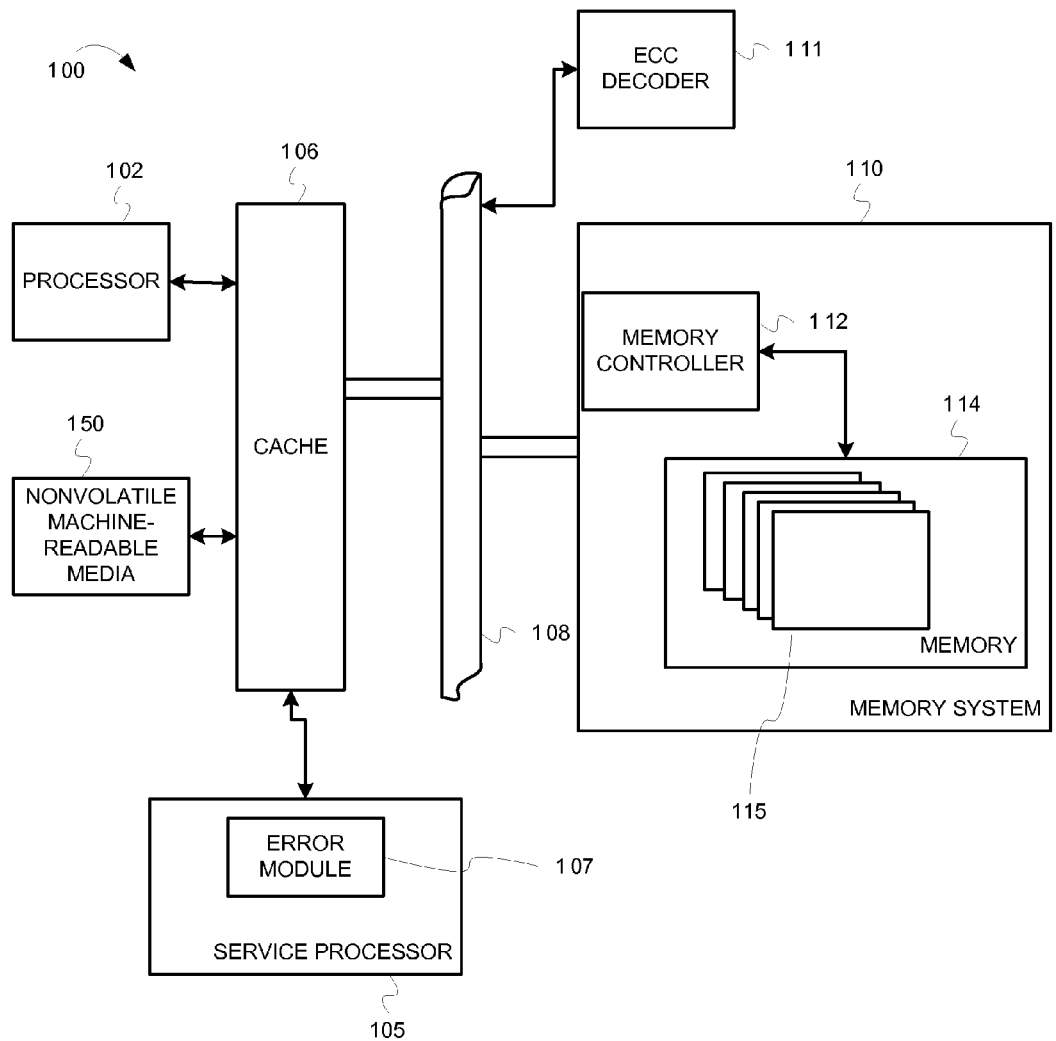
FIG. 1 depicts a computer system for preemptive memory repair based on a multi-symbol, multi-scrub cycle analysis, according to some example embodiments.

The description that follows includes exemplary systems, methods, techniques, instruction sequences and computer program products that embody techniques of the present inventive subject matter. However, it is understood that the described embodiments may be practiced without these specific details. For instance, although examples refer to three types of preemptive repairs of memory, some example embodiments can apply a greater or lesser number of preemptive repairs and other types of preemptive repairs. In other instances, well-known instruction instances, protocols, structures and techniques have not been shown in detail in order not to obfuscate the description.

Errors in memory can occur because the memory cells are not storing the data properly. Errors can also occur external to the memory (e.g., data pins accessing the memory) to cause errors in the memory. Some example embodiments collect data for analysis to apply different types of repair to memory to correct these errors. In some example embodiments, Error Correction Code (ECC) memory can apply different repair methods to the memory for repair. A first repair method includes a symbol mark repair that repairs one symbol wide ECC cache line error—two-bit wide repair. A second repair method includes a chip mark repair that would repair one chip wide ECC cache line error—eight-bit wide repair. In some example embodiments, the symbol mark repair and the chip mark repair are corrected using one or more of the Error Correction Code (ECC) operations. In particular, based on the ECC check bits, a determination can be made on what data should have been stored in the memory. Accordingly, the ECC operations can receive the data that is incorrect from the memory and recalculate to provide the correct data. Such ECC operations can be performed for a symbol-level wide access and for a chip-level wide access. A third repair method includes a memory (e.g., Dynamic Random Access Memory (DRAM)) steering. The memory steering would deploy one spare memory chip on the occurrence of one bad chip. Some example embodiments create and apply different criteria for determining which repair methods to apply for memory repair. Some example embodiments collect additional data for creating these different criteria, in comparison to conventional memory repair methods.

In particular, some example embodiments include an analysis that spans multiple scrub cycles and multiple symbols across the multiple scrub cycles. Accordingly, embodiments are able to track small errors that can build up slowly over time (which may not be detected by conventional methods of error detection). If not repaired, these small correctable errors can turn into an unrecoverable error followed by a system crash.

Conventional methods do not attempt to find multiple failing symbols across multiple scrub cycles. Accordingly with conventional methods, a bad symbol may be detected for a single scrub cycle but not during another scrub cycle. Therefore with conventional methods, the chance of an imminent unrecoverable error (caused by multiple failing symbols) still remains, because there is not enough data for analyze and act thereon.

Some example embodiments accumulate recoverable error statistics over a period of time across multiple scrub cycles to find multiple symbols having recoverable errors across a cache line, which may lead to an unrecoverable error later. After accumulating scrub statistics of multiple symbols across multiple scrub cycles, such statistics can be analyzed. As further described below, various combinations of multiple symbols having recoverable errors across multiple scrub cycles relative to a configurable threshold can be determined. Such analysis can result in various preemptive ECC repairs, memory replacement repair, etc. applied to the memory having the recoverable errors.

Some example embodiments create a two-dimensional data array or table to store statistics about recoverable errors (CE) in memory. The CE statistics can be for symbols of a given rank of memory. Also, the CE statistics can be collected for each scrub cycle, wherein CE statistics across multiple scrub cycles are stored in the two-dimensional array. The CE statistics for each scrub cycle can be inserted and deleted out of the array on a First In First Out (FIFO) basis. The size of the array (CE_Table) can be N symbols×sliding window:

CE_Table[N_Symbols][Sliding_Window], wherein

N_Symbols=number of symbols on a given rank for the memory controller for the memory;

Sliding_Window=number of scrub cycles used for CE analysis

The CE_Table[N_Symbols][0] has the data statistics for the oldest scrub cycle and the CE_Table[N_Symbols][Sliding_Window−1] has the data statistics for the current scrub cycle. In some example embodiments, the data can be collected across the number of scrub cycles that are stored in the array. The size of the array can vary based on the type of system, the type of memory, the type of applications, etc. In some example embodiments, there is a table for each rank within a memory. While described relative to a rank of memory, some example embodiments are applicable to any section or subsection of different address ranges (e.g., a row) in memory. Also, there can be multiple tables for tracking the errors for different ranks in memory. A rank can be of different size depending on the type of system, application, etc. (e.g., one Gigabyte, two Gigabytes, etc.). Therefore as further described below, the analysis and error correction can occur separately for separate ranks in the memory. Example tables are described in more detail below.

FIG. 1 depicts a computer system for preemptive memory repair based on a multi-symbol, multi-scrub cycle analysis, according to some example embodiments. A computer system 100 includes a processor 102 (possibly including multiple processors, multiple cores, multiple nodes, and/or implementing multi-threading, etc.). The computer system 100 also includes a cache 106 that can be representative of different levels of cache (e.g., L1, L2, L3, etc.). The processor 102 is communicatively coupled to the cache 106 that is communicatively coupled to a bus 108 (e.g., PCI, ISA, PCI-Express, HyperTransport®, InfiniBand®, NuBus, etc.), a network interface YY05 (e.g., an ATM interface, an Ethernet interface, a Frame Relay interface, SONET interface, wireless interface, etc.), and a storage device(s) YY09 (e.g., optical storage, magnetic storage, etc.).

The computer system 100 also includes a memory system 110 that includes a memory controller 112 and memory 114. The memory system 110 is communicatively coupled to the bus 108. The memory 114 can include Synchronous Dynamic Access Memory (SRAM), DRAM, zero capacitor RAM, Twin Transistor RAM, Extended Data Out (EDO) RAM, Double Data Rate (DDR) RAM, Nano Ram (NRAM), Resistive Ram (RRAM), etc. The memory 114 includes a number of modules 115 (e.g., Dual In-Line Memory Modules (DIMMs), which can include one or more ranks. In some example embodiments, a rank of one of the modules 115 can be associated with a number of memory chips thereon. In some example embodiments, one or more of the memory chips can be spare chips that are used for memory steering repair (one of the possible preemptive repairs for correctable errors).

The computer system 100 also includes a service processor 105 that is configured to execute an error module 107. The service processor 105 is communicatively coupled to the cache 106. For example, the error module 107 can be software and/or firmware instructions. As further described below, upon execution, the error module 107 can locate errors for data stored in the ranks 115 of the memory 114. The error module 107 can also populate a two-dimensional array that stores errors across multiple symbols and across multiple scrub cycles. The error module 107 can also configure the memory 114 for preemptive repairs based on the number of errors across multiple symbols and multiple scrub cycles relative to a configurable threshold. Operations of the error module 107 are further described below in reference to the flowcharts illustrated in FIGS. 2-5. While described such that the operation of the error module 107 are executed on a separate service processor relative to the processor 102, in some other example embodiments, the processor 102 can execute the error module 107.

The computer system 100 also includes an ECC decoder 111 that is communicatively coupled to the bus 108. As further described below, the ECC decoder 111 can be configured to execute ECC operations to correct memory errors for data in the memory 114. For example, the ECC decoder 111 can execute ECC operations to perform at least one of a symbol mark repair and a chip mark repair. In particular, based on the ECC check bits, a determination can be made on what data should have been stored in the memory. Accordingly, the ECC operations can receive the data that is incorrect from the memory and recalculate to provide the correct data. Such ECC operations can be performed for a symbol-level wide access and for a chip-level wide access.

The computer system 100 also includes a nonvolatile machine-readable media 150 (e.g., optical storage, magnetic storage, etc.) that is communicatively coupled to the bus 108. Further, realizations may include fewer or additional components not illustrated in FIG. 1 (e.g., video cards, audio cards, additional network interfaces, peripheral devices, etc.).

Flowcharts of operations, according to some example embodiments, are now described. In particular, FIGS. 2 and 4-6 depict flowcharts for preemptive memory repair based on a multi-symbol, multi-scrub cycle analysis. As further described below, the operations of the flowcharts in FIGS. 2 and 4-5 move across each other at different transition points (transition points A, B, and C). FIG. 6 depicts a flowchart that includes operations that are an expansion of an operation at block 406 of FIG. 4. In some example embodiments, the operations of the flowcharts in FIGS. 2 and 4-6 are performed by the error module 107 and the ECC decoder 111 of FIG. 1. Accordingly, the flowcharts of FIGS. 2 and 4-6 are described with reference to the computer system 100. Also, to help with the description, the flowcharts are described with reference to the example two-dimensional tables illustrated in FIGS. 3 and 7. The operations of the flowcharts of FIGS. 2-5 are described relative to being performed for one rank in the memory. However, some example embodiments can be performed for more than one or all of the ranks therein.

Figure 2:
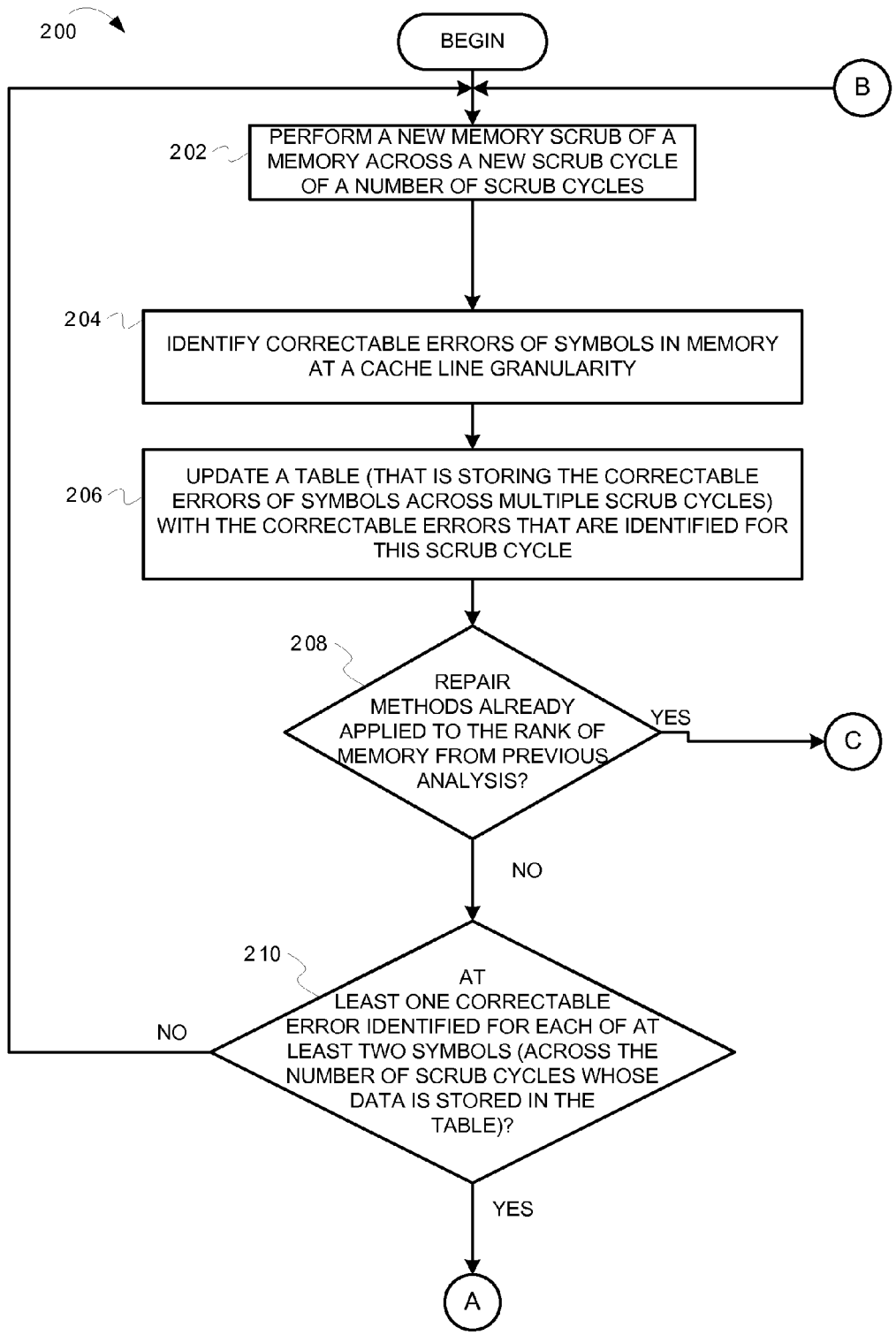
FIG. 2 depicts a flowchart for preemptive memory repair based on a multi-symbol, multi-scrub cycle analysis, according to some example embodiments.

FIG. 2 depicts a flowchart for preemptive memory repair based on a multi-symbol, multi-scrub cycle analysis, according to some example embodiments. The operations of a flowchart 200 start at block 202.

At block 202, the error module 107 performs a new memory scrub of a memory across a new scrub cycle for a number of scrub cycles. With reference to FIG. 1, the error module 107 performs the new memory scrub of a rank of the memory 114. During a memory scrub cycle, a cache line from the cache 106 is read, causing a corresponding read of the data from the memory 114. In some example embodiments, the symbols of the cache line cover the address space for the memory 114. The ECC decoder 111 detects if there are any symbol errors, using ECC operations (e.g., using check bits stored as part of the cache line). For each symbol error identified, the error module 107 is notified. In some example embodiments, a new memory scrub is performed periodically (e.g., every 12 hours). Operations of the flowchart 200 continue at block 204.

At block 204, the ECC decoder 111 identifies the correctable errors of symbols in the memory 114 at a cache line granularity. With reference to FIG. 1, the ECC decoder 111 can receive the data from the memory 114 and determine whether the correct data is being returned in response to the access. As noted in some example embodiments, the memory scrub is for each symbol in a given cache line of the cache 106. Also, the ECC decoder 111 can provide the identification of the correctable errors to the error module 107. Operations of the flowchart 200 continue at block 206.

At block 206, the error module 107 updates a table (that is storing the correctable errors of symbols defined in the cache line of the cache across multiple scrub cycles with the correctable errors that are identified for this scrub cycle. With reference to FIG. 1, the error module 107 can receive these identifications of correctable errors from the ECC decoder 111. To illustrate, FIG. 3 depicts a two-dimensional table for storage of errors for multiple symbols across multiple scrub cycles, according to some example embodiments. FIG. 3 depicts a table 300 that stores a count of correctable errors for symbols along a cache line of a cache. The vertical axis of the table 300 includes rows for different scrub cycles for a cache line. The horizontal axis of the table 300 includes columns for the different symbols for the memory 114 at a cache line granularity (e.g., 128 bytes). In some example embodiments, a cache line comprises two 64-byte ECC words, wherein ECC generation and checking is performed for each 64-byte word. As described herein, the correctable error statistics can be stored per rank. Accordingly in some example embodiments, a scrub reads all the cache lines in a rank. The memory controller 112 maintains a count per symbol of how many reads encounter a coverable error for that symbol. For example, a count of 64 for symbol N at the end of a scrub indicates there was a coverable error on a same symbol index for 64 different ECC words or 32 different cache lines in that rank.

In particular, the table 300 includes 10 different columns that map to 10 different symbols of a cache line. For sake of clarity, only 10 symbols are shown for a given cache line. In some example embodiments, a given cache line in the cache 106 includes 72 symbols. In such embodiments, the table 300 would include 72 different columns for the 72 different symbols of the cache line. The table 300 includes 10 columns for 10 different symbols—columns 322, 324, 326, 328, 330, 332, 334, 336, 338, and 340. The column 322 stores the correctable error count for a first symbol in the cache line. The column 324 stores the correctable error count for a second symbol in the cache line. The column 326 stores the correctable error count for a third symbol in the cache line. The column 328 stores the correctable error count for a fourth symbol in the cache line. The column 330 stores the correctable error count for a fifth symbol in the cache line. The column 332 stores the correctable error count for a sixth symbol in the cache line. The column 334 stores the correctable error count for a seventh symbol in the cache line. The column 336 stores the correctable error count for an eighth symbol in the cache line. The column 338 stores the correctable error count for a ninth symbol in the cache line. The column 340 stores the correctable error count for a tenth symbol in the cache line.

The table 300 also includes 10 different rows that map to 10 different scrub cycles. For sake of clarity, only 10 different scrub cycles are shown. However, a lesser or greater number of scrub cycles can be stored in the table 300. The table 300 includes 10 different rows—rows 302, 304, 306, 308, 310, 312, 314, 316, 318, and 320. The row 302 stores the error count for the 10 different symbols for the current scrub cycle. The row 304 stores the error count for the same 10 symbols for the previous scrub cycle. The row 306 stores the error count for the same 10 symbols for the previous scrub cycle. The row 308 stores the error count for the same 10 symbols for the previous scrub cycle. The row 310 stores the error count for the same 10 symbols for the previous scrub cycle. The row 312 stores the error count for the same 10 symbols for the previous scrub cycle. The row 314 stores the error count for the same 10 symbols for the previous scrub cycle. The row 316 stores the error count for the same 10 symbols for the previous scrub cycle. The row 318 stores the error count for the same 10 symbols for the previous scrub cycle. The row 320 stores the error count for the same 10 symbols for the oldest scrub cycle.

In some example embodiments, the rows of the table 300 are created and deleted on a First-In-First-Out (FIFO) basis. In particular, the table 300 stored a defined number of scrub cycles in the rows. In this example, the table 300 stores error counts for symbols for 10 different scrub cycles. Once error counts for more than 10 scrub cycles are tracked, the error module 107 (of FIG. 1) deletes the oldest scrub cycle for storage of the current scrub cycle.

Returning to the description of FIG. 2, the error module 107 updates the table 300 based on the error counts for the different symbols along the cache line (received from the ECC decoder 111). In this example, the error module 107 would store the error counts for the current scrub cycle at the top of the table 300 (row 302) and delete the row with the oldest scrub cycle—the scrub cycle that is older in time relative to the oldest scrub cycle stored in the row 320. The table 300 can be stored in the nonvolatile machine-readable media 150. The operations of the flowchart 200 of FIG. 2 continue at block 208.

At block 208, the error module 107 determines whether repair methods were already applied to this rank of the memory from a previous analysis. In particular as further described below, a defined number of repair methods can be applied to a given rank of memory for repairing errors for symbols therein. Therefore, if some of these repair methods are currently being applied to repair previous identified errors for other symbols, these repair methods are not used for repairing any errors for symbols identified during this analysis. In some example embodiments, three different repair methods are applied to a given rank of memory—symbol mark repair, chip mark repair and memory steering repair. As further described below, at least two of these repairs can be applied for a given analysis, such that the third repair can be applied for errors identified in a subsequent analysis. Accordingly, this operation at block 208 is needed to determine if such repairs have been applied from a previous analysis. If there have been repairs applied from a previous analysis, operations of the flowchart 200 continue to transition point C, which continues at a flowchart 500 of FIG. 5 (which is described in more detail below). Otherwise, operations of the flowchart 200 continue at block 210.

At block 210, the error module 107 determines whether at least correctable error has been identified for each of at least two symbols (across the number of scrub cycles whose data is stored in the table). With reference to FIG. 3, the error module 107 determines whether there are at least two nonzero entries for two different symbols across the entire table 300. Accordingly, the error module 107 is performing an analysis across multiple scrub cycles. In this example, there are 12 nonzero entries in the table 300 for three different symbols:

1) the entry at row 302, column 330 stores an error count of 20—first symbol;
2) the entry at row 304, column 330 stores an error count of 20—first symbol;
3) the entry at row 306, column 330 stores an error count of 15—first symbol;
4) the entry at row 308, column 330 stores an error count of 20—first symbol;
5) the entry at row 310, column 330 stores an error count of 35—first symbol;
6) the entry at row 312, column 330 stores an error count of 20—first symbol;
7) the entry at row 314, column 330 stores an error count of 20—first symbol;
8) the entry at row 316, column 330 stores an error count of 20—first symbol;
9) the entry at row 318, column 330 stores an error count of 18—first symbol;
10) the entry at row 320, column 330 stores an error count of 15—first symbol;
11) the entry at row 316, column 322 stores an error count of 16—second symbol;
12) the entry at row 316, column 340 stores an error count of 11—third symbol Accordingly, in this example, the error module 107 traverses the table 300 and located three symbols with nonzero entries. If there are not at least two symbols with nonzero entries, the operations of the flowchart 200 continue at block 202, where a new memory scrub is performed for a new scrub cycle. Otherwise, operations of the flowchart 200 at transition point A, which continues at a flowchart 400 of FIG. 4 (which is now described).

Figure 4:
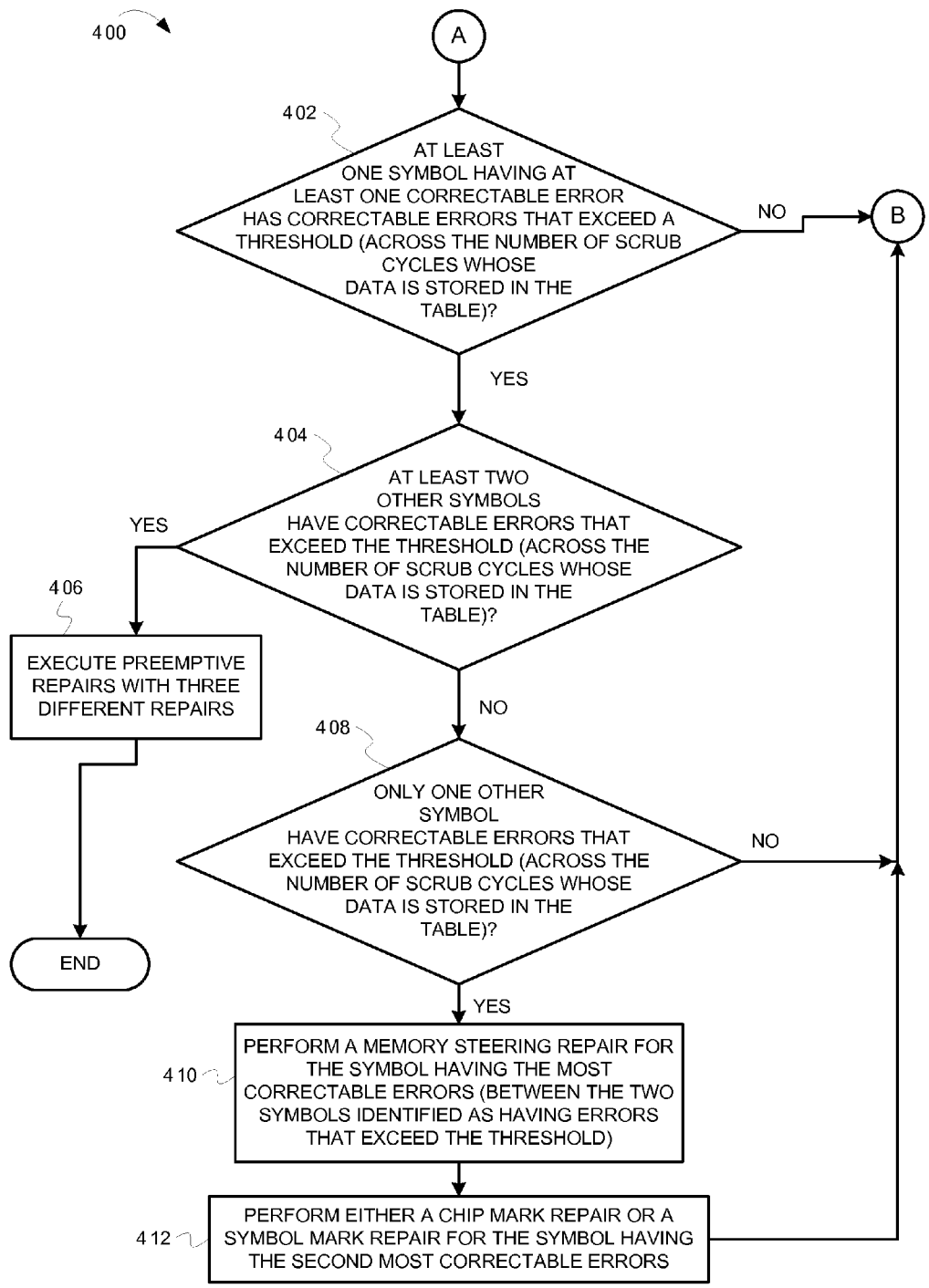
FIG. 4 depicts a flowchart of continued operations for preemptive memory repair based on a multi-symbol, multi-scrub cycle analysis, according to some example embodiments.

FIG. 4 depicts a flowchart of continued operations for preemptive memory repair based on a multi-symbol, multi-scrub cycle analysis, according to some example embodiments. The operations of a flowchart 400 start at block 402.

At block 402, the error module 107 determines whether at least one symbol having at least one correctable error has correctable errors that exceed a threshold (across the number of scrub cycles whose data is stored in the table. With reference to FIG. 3, the error module 107 determines whether at least one of the three symbols that were identified as having nonzero error counts (symbol one, symbol two, or symbol three) have entries in the table 300 that have error counts that exceed a threshold. In some example embodiments, the threshold is a configurable value that is dependent on the type of system, type of application, type of memory, etc. Assume that the threshold is set to a value of 30. In this example, one entry of the table 300 exceeds the threshold—the entry at row 310, column 330 stores an error count of 35. If there is not at least one symbol having an entry whose error count exceeds the threshold, operations of the flowchart 400 continue at transition point B, which returns to the flowchart 200 at block 202, where a new memory scrub is performed for a new scrub cycle. Otherwise, operations of the flowchart 400 continue at block 404.

At block 404, the error module 107 determines whether at least two other symbols have correctable errors that exceed the threshold (across the number of scrub cycles whose data is stored in the table). With reference to FIG. 3, the error module 107 traverses the table 300 again to attempt to locate at least two other symbols have correctable errors that exceed the threshold. Assume that the threshold is set to a value of 10 instead of 30. In such a case, the error module 107 identifies two other symbols whose error count for an entry exceed the threshold:

1) the entry at row 316, column 322 stores an error count of 16—second symbol;
2) the entry at row 316, column 340 stores an error count of 11—third symbol If there are at least two other symbols having correctable errors that exceed the threshold, operations of the flowchart 400 continue at block 406. Otherwise, operations of the flowchart 400 continue at block 408.

At block 406, the error module 107 executes preemptive repairs with three different repairs. In particular, the error module 107 has identified at least three symbols with error counts that have exceeded the threshold. The operations of executing the preemptive repairs with three different repairs are described in more detail below in reference to FIG. 6. The operations of the flowchart 400 of FIG. 4 are then complete.

At block 408, the error module 107 determines whether at least one other symbol has correctable errors that exceed the threshold (across the number of scrub cycles whose data is stored in the table). With reference to FIG. 3, the error module 107 traverses the table 300 again to attempt to locate at least one other symbol have correctable errors that exceed the threshold. Assume that the threshold is set to a value of 15 instead of 30 or 10. In such a case, the error module 107 identifies one other symbol whose error count for an entry exceed the threshold:

1) the entry at row 316, column 322 stores an error count of 16—second symbol If there is not at least one other symbol having correctable errors that exceed the threshold, operations of the flowchart 400 continue at transition point B, which returns to the flowchart 200 at block 202, where a new memory scrub is performed for a new scrub cycle. Otherwise, operations of the flowchart 400 continue at block 410.

At block 410, the error module 107 performs a memory steering repair for the symbol having the most correctable errors (between the two symbols identified as having errors that exceed the threshold). In particular, the error module 107 identified a first symbol having an error count that exceeds the threshold at block 402 and a second symbol having an error count that exceeds the threshold at block 408. For the memory steering repair, the error module 107 would configure the memory 114 such that the memory chip storing the symbol with the most correctable errors is replaced with a spare memory chip. As described above, the memory 114 is configured such that a spare chip is available to allow for memory steering. As part of the repair, the error module 107 can copy the contents from the chip being replaced into the spare chip (except for the symbol(s) with the error counts that exceed the threshold). The error module 107 can write the correct data for these symbols based on the data provided by the ECC decoder 111. Also, the error module 107 can reconfigure the memory controller 112 such requests for data being accessed from the old chip are now redirected to the spare chip. While described such that the memory steering repair is applied to the memory chip storing the symbol with the most correctable errors, some other embodiments can use other criteria to determine which repair to apply to which symbol (as further described below). Operations of the flowchart 400 continue at block 412.

At block 412, the error module 107 performs either a chip mark repair or a symbol mark repair for the other symbol having correctable errors that exceed the threshold. In some example embodiments, the error module 107 determines which repair to use based on the width of the failure. For example, if there are other symbols with nonzero error counts that are adjacent or near each other (being a part of a same chip), the error module 107 performs a chip mark repair (thereby correcting eight bits). If there are not other symbols having errors that are near or adjacent to this particular error, the error module 107 performs a symbol mark repair (thereby correcting two bits). In some example embodiments, the symbol mark repair and the chip mark repair are performed using one or more of the Error Correction Code (ECC) operations performed by the ECC decoder 111. In particular, based on the ECC check bits, the ECC decoder 111 determines what data should have been stored in the memory. Accordingly, the ECC decoder 111 can receive the data that is incorrect from the memory and recalculate to provide the correct data. Such ECC operations can be performed for a symbol-level wide access and for a chip-level wide access. Accordingly, the error module 107 can transmit an instruction to the ECC decoder 111 to perform the chip mark repair or the symbol mark repair for a given set of bits that are accessed from the memory 114. Operations of the flowchart 400 continue at transition point B, which returns to the flowchart 200 at block 202, where a new memory scrub is performed for a new scrub cycle.

Figure 5:
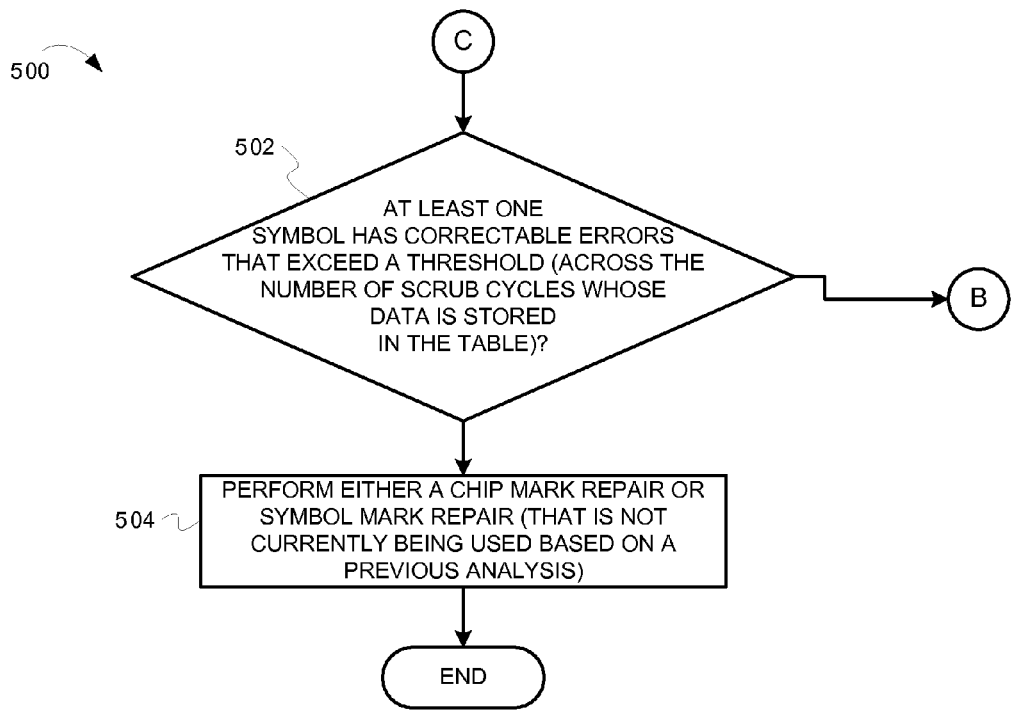
FIG. 5 depicts a flowchart of continued operations for preemptive memory repair based on a multi-symbol, multi-scrub cycle analysis, according to some example embodiments.
Figure 6:
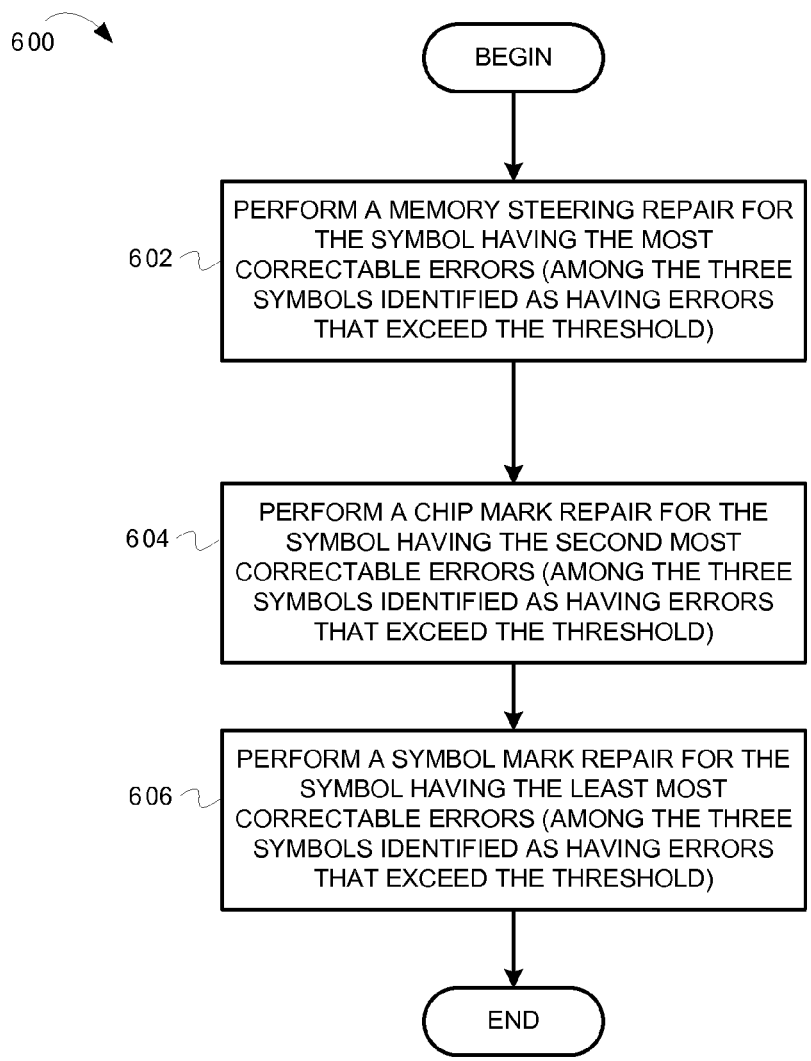
FIG. 6 depicts a flowchart for preemptive memory repair with three different repairs, according to some example embodiments.

FIG. 5 depicts a flowchart of continued operations for preemptive memory repair based on a multi-symbol, multi-scrub cycle analysis, according to some example embodiments. The operations of a flowchart 500 start at block 502. This is a continuation from transition point C of the flowchart 200 of FIG. 2, wherein it was determined there have been repairs applied from a previous analysis. If such repairs have been done from a previous analysis, two of the three repairs were used (see blocks 410-412 described above).

At block 502, the error module 107 determines whether at least one symbol has correctable errors that exceed the threshold (across the number of scrub cycles whose data is stored in the table). With reference to FIG. 3, the error module 107 traverses the table 300 to locate a symbol that has correctable errors that exceed the threshold. In some example embodiments, if there are multiple symbols that satisfy these criteria, the error module 107 selects the symbol with the most correctable errors. In some example embodiments, the error module 107 selects the first symbol that satisfies the criteria that was located during the traversal of the table 300. If there is not at least one symbol having an entry whose error count exceeds the threshold, operations of the flowchart 400 continue at transition point B, which returns to the flowchart 200 at block 202, where a new memory scrub is performed for a new scrub cycle. Otherwise, operations of the flowchart 400 continue at block 504.

At block 504, the error module 107 performs either a chip mark repair or a symbol mark repair for this identified symbol. In particular, the error module 107 performs the repair that is not currently being used based on the previous analysis. The error module 107 performs the repair that was not selected at block 412 described above where either the chip mark repair or the symbol mark repair is selected). In some example embodiments, the symbol mark repair and the chip mark repair are performed using one or more of the Error Correction Code (ECC) operations performed by the ECC decoder 111. In particular, based on the ECC check bits, the ECC decoder 111 determines what data should have been stored in the memory. Accordingly, the ECC decoder 111 can receive the data that is incorrect from the memory and recalculate to provide the correct data. Such ECC operations can be performed for a symbol-level wide access and for a chip-level wide access. Accordingly, the error module 107 can transmit an instruction to the ECC decoder 111 to perform the chip mark repair or the symbol mark repair for a given set of bits that are accessed from the memory 114. Operations of the flowchart 500 are complete (as all three repairs are being applied to this rank of memory).

FIG. 6 depicts a flowchart for preemptive memory repair with three different repairs, according to some example embodiments. A flowchart 600 includes operations that are an expansion of the operation at block 406 of FIG. 4 (wherein preemptive repairs with three different repairs are executed). The operations of the flowchart 600 start at block 602.

At block 602, the error module 107 performs a memory steering repair for the symbol having the most correctable errors (among the three symbols identified as having errors that exceed the threshold). In particular, the error module 107 identified a first symbol having an error count that exceeds the threshold at block 402 and a second and third symbols having an error count that exceeds the threshold at block 404. For the memory steering repair, the error module 107 would configure the memory 114 such that the memory chip storing the symbol with the most correctable errors is replaced with a spare memory chip. As described above, the memory 114 is configured such that a spare memory chip is available to allow for memory steering. As part of the repair, the error module 107 can copy the contents from the memory chip being replaced into the spare memory chip (except for the symbol(s) with the error counts that exceed the threshold). The error module 107 can write the correct data for these symbols based on the data provided by the ECC decoder 111. Also, the error module 107 can reconfigure the memory controller 112 such requests for data being accessed from the old memory chip are now redirected to the spare memory chip. Operations of the flowchart 600 continue at block 604.

At block 604, the error module 107 performs a chip mark repair for the symbol having the second most correctable errors that exceed the threshold. In some example embodiments, the chip mark repair are performed using one or more of the Error Correction Code (ECC) operations performed by the ECC decoder 111. In particular, based on the ECC check bits, the ECC decoder 111 determines what data should have been stored in the memory. Accordingly, the ECC decoder 111 can receive the data that is incorrect from the memory and recalculate to provide the correct data. Accordingly, the error module 107 can transmit an instruction to the ECC decoder 111 to perform the chip mark repair for the eight bits that are accessed from the memory 114. Operations of the flowchart 600 continue at block 606.

At block 606, the error module 107 performs a symbol mark repair for the symbol having the third most correctable errors that exceed the threshold. In some example embodiments, the symbol mark repair are performed using one or more of the Error Correction Code (ECC) operations performed by the ECC decoder 111. In particular, based on the ECC check bits, the ECC decoder 111 determines what data should have been stored in the memory. Accordingly, the ECC decoder 111 can receive the data that is incorrect from the memory and recalculate to provide the correct data. Accordingly, the error module 107 can transmit an instruction to the ECC decoder 111 to perform the symbol mark repair for two bits that are accessed from the memory 114. Operations of the flowchart 600 are complete.

While described such that the memory steering repair is applied to the symbol with the most correctable errors, the chip mark repair is applied to the symbol with the second most correctable errors, and the symbol mark repair is applied to the symbol having the least number of correctable errors; some example embodiments can apply these repairs to the different symbols based on other criteria. For example, the error module 107 can consider the grouping of symbols having correctable errors. In particular, the error module 107 can select the memory steering repair for that memory chip having the most correctable errors within that chip. Also in some example embodiments, the error module 107 can determine which repair to use based on the width of the failure. For example, if there are other symbols with nonzero error counts that are adjacent or near each other (being a part of a same chip), the error module 107 performs a chip mark repair (thereby correcting eight bits). If there are not other symbols having errors that are near or adjacent to this particular error, the error module 107 performs a symbol mark repair (thereby correcting two bits).

Some example embodiments can use alternative or additional criteria for determining that a symbol is eligible for repair. To illustrate, FIG. 7 depicts a two-dimensional table for storage of errors for multiple symbols across multiple scrub cycles, according to some other example embodiments. Similar to FIG. 3, FIG. 7 depicts a table 700 that stores a count of correctable errors for symbols along a cache line of a cache. The vertical axis of the table 700 includes rows for different scrub cycles for a cache line. The horizontal axis of the table 700 includes columns for the different symbols for a cache line.

In particular, the table 700 includes 10 different columns that map to 10 different symbols of a cache line. For sake of clarity, only 10 symbols are shown for a given cache line. In some example embodiments, a given cache line in the cache 106 includes 72 symbols. In such embodiments, the table 700 would include 72 different columns for the 72 different symbols of the cache line. The table 700 includes 10 columns for 10 different symbols—columns 722, 724, 726, 728, 730, 732, 734, 736, 738, and 740. The column 722 stores the correctable error count for a first symbol in the cache line. The column 724 stores the correctable error count for a second symbol in the cache line. The column 726 stores the correctable error count for a third symbol in the cache line. The column 728 stores the correctable error count for a fourth symbol in the cache line. The column 730 stores the correctable error count for a fifth symbol in the cache line. The column 732 stores the correctable error count for a sixth symbol in the cache line. The column 734 stores the correctable error count for a seventh symbol in the cache line. The column 736 stores the correctable error count for an eighth symbol in the cache line. The column 738 stores the correctable error count for a ninth symbol in the cache line. The column 740 stores the correctable error count for a tenth symbol in the cache line.

The table 700 also includes 10 different rows that map to 10 different scrub cycles. For sake of clarity, only 10 different scrub cycles are shown. However, a lesser or greater number of scrub cycles can be stored in the table 700. The table 700 includes 10 different rows—rows 702, 704, 706, 708, 710, 712, 714, 716, 718, and 720. The row 702 stores the error count for the 10 different symbols for the current scrub cycle. The row 704 stores the error count for the same 10 symbols for the previous scrub cycle. The row 706 stores the error count for the same 10 symbols for the previous scrub cycle. The row 708 stores the error count for the same 10 symbols for the previous scrub cycle. The row 710 stores the error count for the same 10 symbols for the previous scrub cycle. The row 712 stores the error count for the same 10 symbols for the previous scrub cycle. The row 714 stores the error count for the same 10 symbols for the previous scrub cycle. The row 716 stores the error count for the same 10 symbols for the previous scrub cycle. The row 718 stores the error count for the same 10 symbols for the previous scrub cycle. The row 720 stores the error count for the same 10 symbols for the oldest scrub cycle.

In some example embodiments, the rows of the table 700 are created and deleted on a First-In-First-Out (FIFO) basis. In particular, the table 700 stored a defined number of scrub cycles in the rows. In this example, the table 700 stores error counts for symbols for 10 different scrub cycles. Once error counts for more than 10 scrub cycles are tracked, the error module 107 (of FIG. 1) deletes the oldest scrub cycle for storage of the current scrub cycle.

To illustrate, the use of alternative or additional criteria for determining that a symbol is eligible for repair different error counts are stored in the entries of the table 700 in comparison to the entries of the table 300. In particular, the same symbol stored in the column 730 has nonzero error counts in the three consecutive scrub cycles (the row 712, the row 710, and the row 708). Also, the same symbol stored in the column 722 has nonzero error counts in two consecutive scrub cycles (the row 718 and the row 716). The same symbol stored in the column 740 has nonzero error counts in two nonconsecutive scrub cycles (the row 720 and the row 716). In some example embodiments, the error module 107 can follow the trend of the error counts for a given symbol to determine whether repair is needed. For example, repair is needed if a same symbol as at least two nonzero error counts for two consecutive scrub cycles (e.g., the symbol in the column 722). In another example, repair is needed if a same symbol has at least two error counts greater than a threshold (e.g., 15) for consecutive or nonconsecutive scrub cycles (e.g., the symbol in the column 730). In another example, repair is needed if a same symbol as at least two nonzero error counts for consecutive or nonconsecutive scrub cycles (e.g., the symbol in the column 740). The error module 107 can use these criteria alternatively or in addition to the criteria described above in FIGS. 2-6. The use as additional criteria can solidify the assumption that the symbol needs correction.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for preemptive memory repair as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    performing a memory scrub of a memory across a scrub cycle of multiple scrub cycles;
    identifying correctable errors of symbols in the memory, that are a result of accesses from a section of the memory in response to the memory scrub;
    performing an analysis across the multiple scrub cycles, wherein the performing of the analysis comprises determining whether at least two symbols across the multiple scrub cycles have at least one correctable error; and
    responsive to determining that at least two symbols across the multiple scrub cycles have at least one correctable error, executing at least one repair of the memory that includes the section of memory.

2. The method of claim 1, wherein the determining of whether at least two symbols across the multiple scrub cycles have at least one correctable error comprises,
    determining whether at least one correctable error has been identified for each of the at least two symbols of the symbols;
    determining whether at least one symbol of the at least two symbols has correctable errors that exceed a threshold; and
    responsive to determining that the at least one other symbol has correctable errors that exceed the threshold, determining whether at least one other symbol of the symbols has correctable errors that exceed the threshold.

3. The method of claim 2, wherein the executing of the at least one repair of the memory that includes the section of memory comprises,
    responsive to determining that the at least one correctable error has been identified for each of the at least two symbols and determining that the at least one symbol of the at least two symbols has correctable errors that exceed the threshold and determining that the at least one other symbol has correctable errors that exceed the threshold, executing the at least one repair of the memory that includes the section of the memory.

4. The method of claim 1, wherein the executing of the at least one repair of the memory that includes the section of memory comprises executing at least two repairs of the memory that includes the section of memory, wherein the at least two repairs comprise at least two of a memory steering repair, a chip mark repair, and a symbol mark repair.

5. The method of claim 1, wherein the determining that at least two symbols across the multiple scrub cycles have at least one correctable error comprises determining the each of the at least two symbols exceed a threshold for at least two consecutive scrub cycles of the multiple scrub cycles.

6. The method of claim 1, wherein the section of memory comprises a rank of the memory.

7. A method comprising:
    performing a memory scrub of a memory across a scrub cycle of a number of scrub cycles;
    identifying correctable errors of symbols in the memory, that are a result of accesses from a section of the memory in response to the memory scrub;
    performing an analysis across the number of scrub cycles, wherein the performing of the analysis comprises,
        determining whether at least one correctable error has been identified for each of at least two symbols of the symbols;
        determining whether at least one symbol of the at least two symbols has correctable errors that exceed a threshold; and
        responsive to determining that the at least one other symbol has correctable errors that exceed the threshold, determining whether at least one other symbol of the symbols has correctable errors that exceed the threshold;
    responsive to determining that at least one correctable error has been identified for each of the at least two symbols and determining that the at least one symbol of the at least two symbols has correctable errors that exceed the threshold and determining that the at least one other symbol has correctable errors that exceed the threshold, executing at least one repair of the memory that includes the section of the memory.

8. The method of claim 7, further comprising determining that a first other symbol and a second other symbol have correctable errors that exceed the threshold during the performing of the analysis, wherein executing the at least one repair of the memory comprises:
    determining an order among the at least one symbol, the first other symbol, and the second other symbol based on a number of correctable errors for the at least one symbol, the first other symbol, and the second other symbol;
    replacing a memory chip of the memory with a spare memory chip for the memory chip storing the symbol with a first most correctable errors among the at least one symbol, the first other symbol, and the second other symbol;

performing a chip wide Error Correction Code (ECC) cache line repair of the memory for a chip of the memory storing the symbol with a second most correctable errors among the at least one symbol, the first other symbol, and the second other symbol; and performing a symbol wide ECC cache line repair of the memory for the symbol with a third most correctable errors among the at least one symbol, the first other symbol, and the second other symbol.

9. The method of claim 7, further comprising performing a different memory scrub of the memory across a different scrub cycle of the number of scrub cycles;

identifying correctable errors of symbols defined in the cache line of the cache that are a result of accesses from the section of the memory in response to the memory scrub for the different scrub cycle;

performing a different analysis across the number of scrub cycles, wherein the performing of the different analysis comprises, determining, across the number of scrub cycles whether a different symbol of the symbols has correctable errors that exceed the threshold and was not identified in the analysis that occurred previously;

responsive to determining that the different symbol has correctable errors that exceed the threshold, executing a different repair of the memory that includes the section of the memory, wherein the executing of the different repair comprises performing the ECC cache line repair that was not performed previously during the at least one repair.

10. The method of claim 7, wherein the section of memory comprises a rank of the memory.

* * * * *